United States Patent
Smith

(10) Patent No.: US 7,033,670 B2
(45) Date of Patent: Apr. 25, 2006

(54) LCT-EPOXY POLYMERS WITH HTC-OLIGOMERS AND METHOD FOR MAKING THE SAME

(75) Inventor: James D. B. Smith, Monroeville, PA (US)

(73) Assignee: Siemens Power Generation, Inc., Orlando, FL (US)

( * ) Notice: Subject to any disclaimer, the term of this patent is extended or adjusted under 35 U.S.C. 154(b) by 150 days.

(21) Appl. No.: 10/618,125

(22) Filed: Jul. 11, 2003

(65) Prior Publication Data

US 2005/0010014 A1   Jan. 13, 2005

(51) Int. Cl.
*B32B 27/38* (2006.01)
*C08L 63/00* (2006.01)

(52) U.S. Cl. .................................. 428/413; 523/435

(58) Field of Classification Search ............... 428/396, 428/402, 403, 404, 405, 407, 413, 414; 427/212, 427/215, 216, 217, 218, 219; 523/400, 435, 523/436, 437, 438, 439, 457, 458, 459
See application file for complete search history.

(56) References Cited

U.S. PATENT DOCUMENTS

| | | |
|---|---|---|
| 4,806,806 A | 2/1989 | Hjortsberg et al. |
| 5,106,294 A | 4/1992 | Profos |
| 5,904,984 A | 5/1999 | Smith et al. |
| 6,190,775 B1 | 2/2001 | Smith et al. |
| 6,261,481 B1 | 7/2001 | Akatsuka et al. |
| 6,288,341 B1 | 9/2001 | Tsunoda et al. |
| 6,369,183 B1 | 4/2002 | Cook et al. |
| 6,384,152 B1 | 5/2002 | Smith et al. |
| 2004/0102529 A1* | 5/2004 | Campbell et al. .............. 516/79 |

* cited by examiner

*Primary Examiner*—Michael J. Feely

(57) ABSTRACT

The present invention relates to homogenous LCT-epoxy polymers with oligomers containing grafted nano-sized HTC-materials and methods for making the same. The homogenous LCT-epoxy polymers with oligomers containing grafted nano-sized HTC-materials comprise HTC-oligomer sub-structures evenly dispersed and essentially completely co-reacted with the LCT-epoxy sub-structures, where the HTC-oligomer sub-structures are organically bonded to the LCT-epoxy sub-structures. This produces homogenous LCT-epoxy polymers with oligomers containing grafted nano-sized HTC-materials that are substantially free of particle wetting and micro-void formation, with improved thermal conductivity properties without compromising on other desired structural integrities.

22 Claims, 2 Drawing Sheets

LCT-EPOXY POLYMERS WITH HTC-OLIGOMERS AND METHOD FOR MAKING THE SAME

CROSS-REFERENCE TO RELATED APPLICATIONS

This application is related to US application "Homogeneous Alumoxane-LCT-Epoxy Polymers and Methods for Making the Same" by inventor James D. Smith, filed herewith and incorporated herein by reference.

BACKGROUND OF THE INVENTION

With the use of any form of electrical appliance, there is a need to electrically insulate conductors. With the push to continuously reduce in size and streamline all things electrical, there is a corresponding need to find better and more condensed insulators.

Epoxy resins have been used extensively in electrical insulators due to their practical benefit of being tough and flexible electrical insulators that can be easily adhered to surfaces. Traditional electrical insulators, such as mica or glass fibers, can be surface coated with these epoxy resins, which increases the material's strength, chemical resistance and electrically insulating properties.

Good electrical insulators, by their very nature, also tend to be good thermal insulators, which is not a desired effect. Thermal insulation, particularly for air-cooled electrical components, reduces the efficiency and durability of the components as well as the unit as a whole. It is desirable to produce insulators, such as groundwall insulators, having maximum electrical insulation while minimizing thermal insulation.

Improvements in epoxy resins have recently been made by using liquid crystal polymers. By mixing an epoxy resin with a liquid crystal polymer, a liquid crystal thermoset (LCT) epoxy resin is produced that contains polymers or monomers that have cross-linked properties and have significantly improved mechanical properties. See U.S. Pat. No. 5,904,984, which is incorporated herein by reference. A further benefit of LCTs is that they also have improved thermal conductivity over standard epoxy resins.

What makes LCT epoxy resins even more appealing is that they are also better able to conduct heat than a standard epoxy resin. U.S. Pat. No. 6,261,481, which is incorporated herein by reference, teaches that LCT epoxy resins can be produced with a thermal conductivity greater than that of conventional epoxy resins. For example, a standard Bisphenol A epoxy is shown to have thermal conductivity values of 0.18 to 0.24 watts per meter degree Kelvin (W/mK) in both the transverse (plane) and thickness direction. By contrast, an LCT epoxy resin is shown to have a thermal conductivity value, when used in practical applications, of no more than 0.4 W/mK in the transverse direction and no more than 0.9 W/mK in the thickness direction. However, the LCT epoxy resin lacks some physical properties, such as thermal stability and impregnating qualities.

Though these efforts benefit the art of electrical insulation, the field would benefit from even more from the ability to transfer heat, without reducing the desired physical characteristics of the insulators. What is needed is an improved LCT-epoxy resin, that has a greater thermal conductivity, but that does not compromise on electrical insulation or other structural integrities.

SUMMARY OF TH INVENTION

The present invention relates to homogenous LCT-epoxy polymers with oligomers containing grafted nano-sized HTC-materials (LCT-epoxy polymers with HTC-oligomers) and methods for making the same.

HTC as used herein refers to high thermal conductivity.

In one aspect the present invention relates to a method of making homogenous LCT-epoxy polymers with oligomers containing grafted nano-sized HTC-materials (HTC-oligomers) that have a dielectric strength of at least 1.2 kV/mil. The steps of this method include grafting at least one functionalized organic group onto a nano-sized HTC-material to produce an HTC-oligomer. The HTC-oligomer is then reacted with at least one LCT-epoxy resin under sufficient conditions to form a uniform dispersion and an essentially complete co-reactivity of the HTC-oligomer with the at least one LCT-epoxy resin and is then cured to produce the homogenous LCT-epoxy polymers with HTC-oligomers.

In this aspect of the invention, the amount of the HTC-oligomer to the LCT-epoxy resin comprises a ratio of between 1:4 and 3:1 by weight. In a more particular embodiment the HTC-oligomer portions of the homogenous LCT-epoxy polymers with HTC-oligomers is 20–50% by weight.

In one embodiment the nano-sized HTC-material comprises at least one of alumina, silica and a metal oxide. In a more particular embodiment the metal oxide is magnesium oxide.

In one embodiment the reacting of the HTC-oligomer with the LCT-epoxy further comprises warming until the mixture is clear.

In another embodiment, the method further comprises mixing at least one anhydriding agent with either or both of the LCT-epoxy resin(s) and the HTC-oligomers, where the homogenous LCT-epoxy polymers with HTC-oligomers are a homogenous LCT-epoxy anhydride polymers with HTC-oligomers.

In another embodiment, the method further comprises mixing at least one vinyl agent with either or both of the LCT-epoxy resin(s) and the HTC-oligomers, where the homogenous LCT-epoxy polymers with HTC-oligomers are a homogenous LCT-epoxy vinyl polymers with HTC-oligomers.

In another embodiment, the mixture is added to an electrical insulator as a coating before curing.

In another aspect the present invention provides homogenous LCT-epoxy polymers with HTC-oligomers. This comprises at least one HTC-oligomer sub-structure, that contains at least one nano-sized HTC-material grafted thereto, and at least one LCT-epoxy sub-structure, where the HTC-oligomer sub-structure is organically bonded to the LCT-epoxy substructure. The thermal conductivity in the transverse direction is at least 0.50 W/mK and in the thickness direction is at least 0.99 W/mK in an environment of 25° C. The homogenous LCT-epoxy polymers with HTC-oligomers has a dielectric strength of at least 1.2 kV/mil, and is substantially free of particle wetting and micro-void formation. Further, approximately 20–75% by weight of the homogenous LCT-epoxy polymers with HTC-oligomers is the HTC-oligomer sub-structure In one embodiment, the HTC-material comprises at least one of alumina, silica and a metal oxide.

In another embodiment the homogenous LCT-epoxy polymers with HTC-oligomers contain at least one anhydride, and the anhydride portion is approximately 20–40% by weight of the homogenous LCT-epoxy polymers with HTC-oligomers.

In yet another embodiment the homogenous LCT-epoxy polymers with HTC-oligomers contain at least one vinyl, and the vinyl portion is approximately 4–16% by weight of the homogenous LCT-epoxy polymers with HTC-oligomers.

Either the homogenous LCT-epoxy polymers with HTC-oligomers or the homogenous LCT-epoxy anhydride/vinyl polymers with HTC-oligomers may be produced as a coating on insulative materials, such as a mica/glass insulating tape.

DETAILED DESCRIPTION OF THE INVENTION

Figure 1:
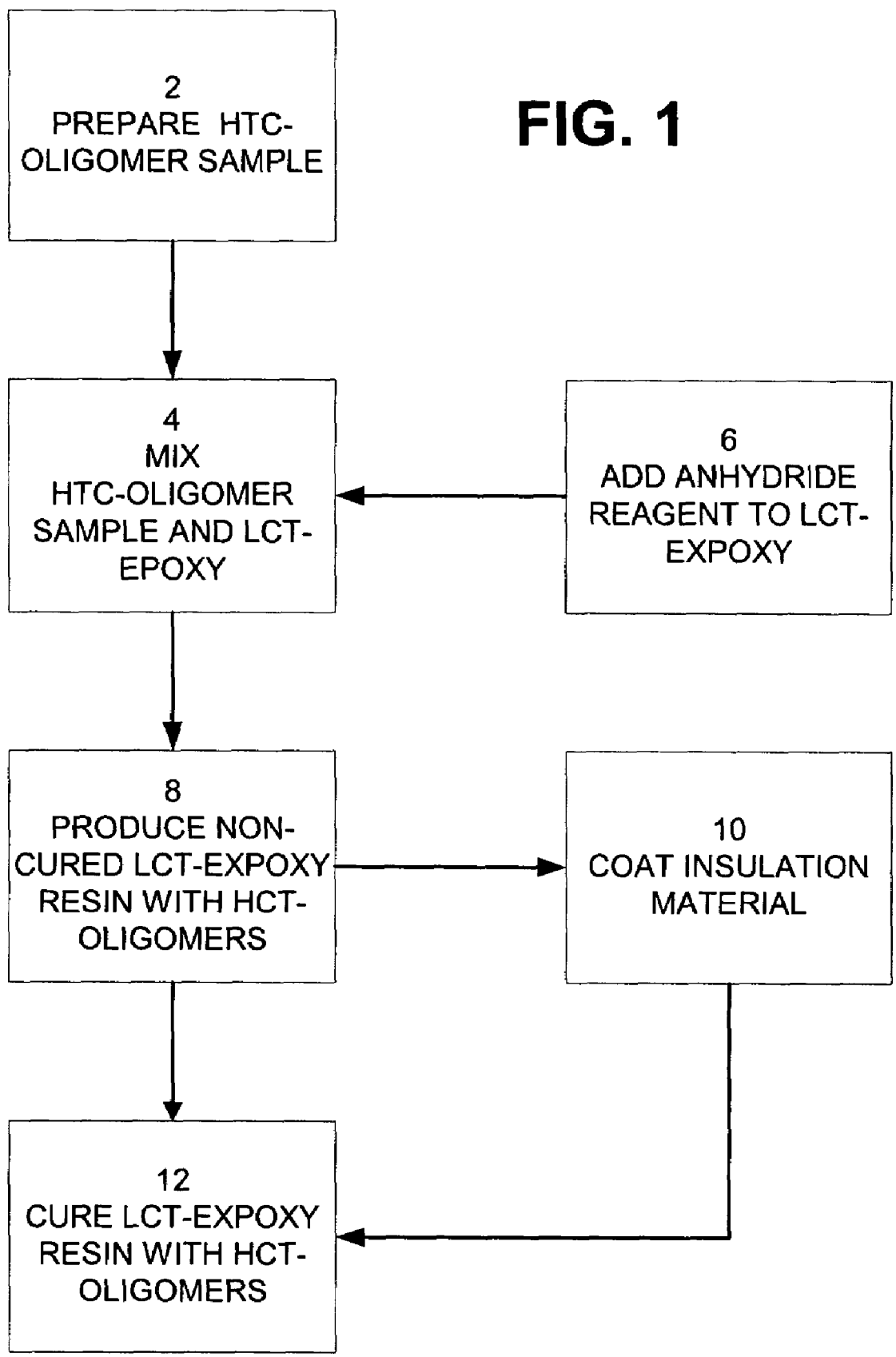
FIG. 1 is a flow chart of a process for making LCT-epoxy polymers with HTC-oligomers according to an embodiment of the present invention.

The present invention relates to homogeneous LCT-epoxy polymers with HTC-oligomers and methods for making the same.

In one aspect the present invention relates to a method of making homogenous LCT-epoxy polymers with oligomers containing grafted nano-sized HTC-materials (HTC-oligomers). The dielectric strength of these polymers is at least 1.2 kV/mil. The steps of making these polymers include grafting at least one functionalized organic group onto a nano-sized HTC-material to produce an HTC-oligomer. The HTC-oligomer is then reacted with at least one LCT-epoxy resin under conditions sufficient to form a uniform dispersion and an essentially complete co-reactivity of the HTC-oligomer with the LCT-epoxy resin(s). This reaction forms an intermediate resin-like mixture that is then cured to produce the homogenous LCT-epoxy polymers with HTC-oligomers.

In this aspect of the invention, the amount of the HTC-oligomer to the amount LCT-epoxy resin comprises a ratio of between 1:4 and 3:1 by weight. In a more particular embodiment the HTC-oligomer portions of the homogenous LCT-epoxy polymers with HTC-oligomers is 20–50% by weight.

Though there are a variety of methods for preparing LCT-epoxy resins, a particular method is warming the sample at approximately 60° C. until the LCT-epoxy resin is clear. Likewise, when mixing the LCT-epoxy resin and the HTC-oligomer, one method is to warm to approximately 60° C. until clear.

In one embodiment the nano-sized HTC-material can be one or more of alumina, silica and a metal oxide. In a more particular embodiment the metal oxide is magnesium oxide. Other appropriate HTC-materials will be apparent to one of ordinary skill in the art.

In another embodiment, the grafting the functionalized organic group(s) onto the nano-sized HTC-material is performed by either a silane grafting or a free radical grafting. In a more particular embodiment, the silane grafting involves reactants chosen from 4-trimethoxysilyl tetra-hydrophthalic anhydride (TSPA) and 3-methacryloxypropyl trimethoxy silane (MOTPS). In another particular embodiment, the free radical grafting involves the reactant ceric ammonium nitrate.

In another embodiment, the method further comprises mixing at least one anhydriding agent with either or both of the LCT-epoxy resin(s) and the HTC-oligomers, where the homogenous LCT-epoxy polymers with HTC-oligomers are a homogenous LCT-epoxy anhydride polymers with HTC-oligomers.

In a particular embodiment the anhydriding agent is taken from the group consisting of 1-methylhexahydrophthalic anhydride and 1-methyltetrahydrophthalic anhydride.

In another particular embodiment the anhydriding agent is approximately 20–40% by weight of the homogenous LCT-epoxy anhydride polymers with HTC-oligomers.

In another embodiment, the method further comprises mixing at least one vinyl agent with either or both of the LCT-epoxy resin(s) and the HTC-oligomers, where the homogenous LCT-epoxy polymers with HTC-oligomers are a homogenous LCT-epoxy vinyl polymers with HTC-oligomers.

In a particular embodiment the vinyl agent is a di-functional monomer, p-vinylphenylglycidylether.

In another particular embodiment the vinyl agent is approximately 20–40% by weight of the homogenous LCT-epoxy vinyl polymers with HTC-oligomers.

In another embodiment the curing of the mixture comprises adding one or both of zinc naphthenate and chromium acetylacetonate.

In another embodiment, the mixture is added to an electrical insulator as a coating before curing.

In another aspect, the present invention provides for a method of making homogenous LCT-epoxy polymers with HTC-oligomers that have a dielectric strength of at least 1.2 kV/mil, which is coated on at least one electrical insulator. This method involves the steps of grafting at least one functionalized organic group onto a nano-sized HTC-material to produce HTC-oligomers. The HTC-oligomers are then reacted with at least one LCT-epoxy resin where an intermediate resin-like mixture is formed. This mixture is then warmed under sufficient conditions to form a uniform dispersion and an essentially complete co-reactivity of the HTC-oligomers with the LCT-epoxy resin(s). The mixture is then impregnated onto the electrical insulator and cured to produce the homogenous LCT-epoxy polymers with HTC-oligomers.

In this aspect the amount of the HTC-oligomers to the at least one LCT-epoxy resin comprises a ratio of between 1:4 and 3:1 by weight.

In one embodiment the method further comprises mixing at least one anhydriding agent with one or both of the LCT-epoxy resin(s) and the HTC-oligomers, where the homogenous LCT-epoxy polymers with HTC-oligomers are a homogenous LCT-epoxy anhydride polymers with HTC-oligomers.

In another embodiment the method further comprises mixing at least one vinyl agent with one or both of the at least one LCT-epoxy resin(s) and the HTC-oligomers, where the homogenous LCT-epoxy polymers with HTC-oligomers are a homogenous LCT-epoxy vinyl polymers with HTC-oligomers.

In a particular embodiment the electrical insulator is a mica/glass insulating tape.

In another aspect the present invention provides homogenous LCT-epoxy polymers with HTC-oligomers. This comprises at least one HTC-oligomer sub-structure that contains at least one nano-sized HTC-material grafted thereto and at least one LCT-epoxy sub-structure, where the HTC-oligomer sub-structure is organically bonded to the LCT-epoxy substructure The thermal conductivity in the transverse direction is at least 0.50 W/mK and in the thickness direction is at least 0.99 W/mK in an environment of 25° C. The homogenous LCT-epoxy polymers with HTC-oligomers has a dielectric strength of at least 1.2 kV/mil, and is substantially free of particle wetting and micro-void formation. Further, approximately 20–75% by weight of the homogenous LCT-epoxy polymers with HTC-oligomers is the HTC-oligomer sub-structure In one embodiment, the HTC-material comprises at least one of alumina, silica and a metal oxide.

In another embodiment the homogenous LCT-epoxy polymers with HTC-oligomers contain at least one anhydride, and the anhydride portion is approximately 20–40% by weight of the homogenous LCT-epoxy polymers with HTC-oligomers.

In yet another embodiment the homogenous LCT-epoxy polymers with HTC-oligomers contain at least one vinyl, and the vinyl portion is approximately 4–16% by weight of the homogenous LCT-epoxy polymers with HTC-oligomers.

Either the homogenous LCT-epoxy polymers with HTC-oligomers or the homogenous LCT-epoxy anhydride/vinyl polymers with HTC-oligomers may be produced as a coating on insulative materials, such as a mica/glass insulating tape.

Synthesis of HTC-Oligomers

HTC-oligomers as used herein refers to any oligomer with grafted nano-sized high thermal conductivity (HTC) material, according to the present invention.

Though there is no intention to be limited to a specific type of HTC-oligomer, or a specific method of synthesizing HTC-oligomers for the purposes of reacting with LCT-epoxy resins, particular nano-sized HTC-materials used may be alumina, silica, and metal oxides, including magnesium oxide and zinc oxide. Furthermore, these materials may be treated in a variety of different ways to produce even more variation on different kinds of HTC-oligomers. Examples of these include metal (or alumina or silica) oxide HTC-oligomers with the basic structure of:

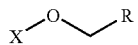

where X represents the HTC-material, and R represents an organic functional group.

As mentioned, the HTC-materials may be chemically grafted with a polymer structure by a variety of methods to produce the multitude of HTC-oligomers possible. A particular example of this is free radical grafting, where a reactant such as ceric ammonium nitrate may be used. Another particular examples is silane grafting. In this example reactants used to produce functional groups include 4-trimethoxysilyl tetra-hydrophthalic anhydride (TSPA) and 3-methacryloxpropyl trimethoxy silane (MOTPS). If these reactants are used, an additional silica group, beyond what may be represented in the X group, will be present:

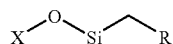

An alumina X group with a TSPA functional group would therefore be:

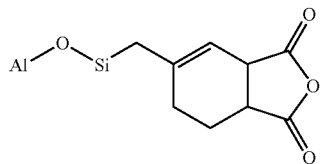

In all cases, the functional group, R, is then used to react with a given substance to produce a desired product.

In one embodiment the functional group reacts with the epoxy group of an LCT-epoxy resin to produce an LCT-epoxy with HTC-oligomers. However, before, concurrently or even after reacting the functional group with the LCT-epoxy group, the functional group may also react with other substance to improve the reaction with the LCT-epoxy and/or the final polymer structure. For example, an anhydride or a vinyl group or both may be added with the LCT-epoxy resin, in the producing of the HTC-oligomers, or when reacting the HTC-oligomer with the LCT-epoxy resin. In such a reaction, the final product would be an LCT-epoxy anhydride polymer with HTC-oligomers or an LCT-epoxy vinyl polymer with HTC-oligomers or even an LCT-epoxy anhydride-vinyl polymer with HTC-oligomers. It should be noted that though the HTC-oligomer may be formed using an anhydride containing reagent, the term anhydride used herein describes resins and polymers of the present invention that have had an additional anhydride reagent added.

The following is a particular method of making a suitable HTC-oligomer as used in the synthesis of homogenous LCT-epoxy polymers with oligomers containing grafted nano-sized HTC-materials (LCT-epoxy polymers with HTC-oligomers):

Graft polymerization reactions were carried out in a round-bottomed, three-neck flask fitted with a stirrer, a gas inlet tube and a thermometer. 2.0 g of nano-size magnesium oxide was dispersed in 25 ml. of distilled water, and the grafting reaction was carried out under nitrogen by bubbling the gas through the reaction mixture. The required amount of initiator solution was then added (0.55 g of ceric ammonium nitrate dissolved in 10 ml of 1N nitric acid, followed by 6.0 ml of methyl methacrylate. The reaction was allowed to proceed for 3 hours at 40° C. The grafted product was extracted in a soxhiet extractor to remove the polymer.

Though the below examples use powdered HTC-oligomers, it will be apparent to one of ordinary skill in the art that the HTC-materials may be delivered to the reaction in other forms, such as in solution.

Synthesis of LCT-Epoxy Polymers with HTC-Oligomers

The synthesis of LCT-epoxy polymers with HTC-oligomers according to the present invention may similarly be done by a variety of methods that will be apparent to one of ordinary skill in the art after review of the procedures contained herein. A particular method, however, comprises:

Alumina-grafted-TSPA-oligomer (HTC-oligomer) (2.5 g) was ground to a fine powder in a porcelain mortar. LCT-epoxy resin RSS-1407 (4.0 g) was warmed to 60° C. in a small glass jar. The HTC-oligomer powder was added to the resin and the mixture stirred for approximately 30 min. until the solution was clear. 0.1 g of zinc naphthenate was added as a cure catalyst and mixed over an additional 5 min. The liquid was then poured into a small aluminum dish and placed in an oven at 150° C. for four hours to cure.

This reaction may be summarized as follows:

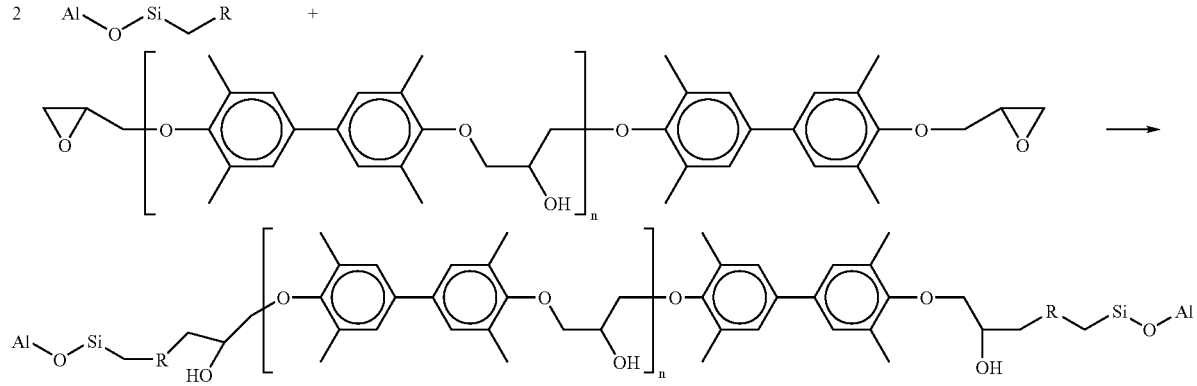

The two HTC-oligomers with an R functional group are reacted with a biphenol LCT-epoxy chain that contains n repeating biphenol units. The result is an LCT-epoxy polymer with cross-linked HTC-oligomers. The HTC-oligomers particles become organically bonded to the LCT-epoxy chain. Though this example uses biphenol LCT-epoxy, this reaction could be performed with any variety of LCT, alone or in combination. Examples of other LCTs can be found in U.S. Pat. No. 5,904,984, which is incorporated herein by reference.

The synthesis of the LCT-epoxy anhydride polymers with HTC-oligomers by this example produces polymers with approximately 38% by weight HTC-oligomer. The remaining percentage is primarily the LCT-epoxies with a small amount of accelerants and other materials. Though this is one embodiment of the present invention, the HTC-oligomer content may be anywhere from approximately 20–75% by weight. With a particular embodiment being from 30–55% by weight and an even more specific embodiment of 35–50% by weight.

Synthesis of LCT-Epoxy Anhydride Polymers with HTC-Oligomers

Similar to the synthesis of the LCT-epoxy polymers with HTC-oligomers, an example of the synthesis of an LCT-epoxy-anhydride polymers with HTC-oligomers comprises:

Biphenol LCT-epoxy resin RSS-1407 (4.0 g) was added to 1-methylHexahydrophthalic anhydride (4.0 g) stirring in a small glass jar warmed to 60° C. on a hot plate. After the solution was clear, an alumina-grafted-TSPA-oligomer (HTC-oligomer) (3.0 g) was added and the solution stirred further at 60 ° C. until the solution was again clear. 0.1 g of zinc naphthenate was added as a cure accelerator and mixed over an additional 5 min. The liquid was then poured into a small aluminum dish and placed in an oven at 150° C. for four hours to cure.

The use of the anhydride components adds additional reactivity to this reaction, aiding the HTC-oligomer's co-reactivity with the LCT-epoxies. Further, the resulting polymers are more fluid, with improved insulative properties. In this example the anhydrides make up approximately 36% by weight of the final LCT-epoxy-anhydride polymers. Though this is one embodiment of the present invention, the anhydride content may be anywhere from approximately 20–40% by weight. In this example, the overall percentage of HTC-oligomers is lower than that of the above example. This might not always be the case, and the addition of anhydride might not reduce the overall percentage of HTC-materials in the resulting polymers.

Synthesis of LCT-Epoxy Anhydride Polymers with HTC-Oligomers

In both of the above examples, an LCT-epoxy polymer with HTC-oligomers may also contain a vinyl group. A variety of methods for including a vinyl group would be apparent to one of ordinary skill the art. However, a particular method of making an LCT-epoxy vinyl polymer with HTC-oligomers, or an LCT-epoxy anhydride-vinyl polymer with HTC-oligomers, would be to follow the above examples, but begin with a MOTPS-oligomer instead of a TSPA-oligomer. In following with the above examples, when the cure accelerator is added, add a vinyl containing reactant, such as the di-functional monomer, p-vinylphenylglycidylether (which, in keeping with the above sample sized, would be approximately 1.0 g).

The addition of a vinyl group to the reaction is dependent upon what types of reagents are being used and under what conditions. For example, some LCT-epoxy resins contain styrene. Therefore the vinyl group would allow for a more complete reaction of the LCT-epoxy resin and the HTC-oligomers, therefore producing a better and more homogeneous polymer. If a vinyl group is added, its approximate percentage in the final polymer will 4–16% by weight.

One of the key features of forming LCT-epoxy polymers with HTC-oligomers or LCT-epoxy anhydride/vinyl polymers with HTC-oligomers by the methods of the present invention, is that the resulting polymers have an increased thermal conductivity, while retaining that which makes them valuable in the coating of electrical insulators. Therefore, the polymers of the present invention have a thermal conductivity value of at least 0.50–0.55 W/mK in the transverse direction. The dispersion of HTC-materials in the LCT-epoxy resin is uniform and its co-reactivity therewith is complete. The polymers are not subject to particle wetting or micro-void formation, and the resin retains its adhesive properties, particularly for the coating of electrical insulators.

As stated, one of the primary uses for homogeneous LCT-epoxy polymers with HTC-oligomers is to coat electrical insulators. Materials such as mica and glass fibers make good electrical insulators, but by themselves lack toughness, resiliency and thermal conductivity. Though, as mentioned earlier, it has been known to coat these insulators in an epoxy resin to improve on their properties, increasing thermal conductivity while maintaining electrical insulation is problematic. The present invention, when used to coat these insulators, improves their thermal conductivity without appreciably reducing the electrical insulation.

For example, a bisphenol A-diglycidyl ether, which is a standard epoxy in the art, has a thermal conductivity value of 0.19 W/mK in the transverse direction and 0.19 W/mK in the thickness direction as well, when operating in an environment of approximately 25° C. Under similar conditions, an LCT-epoxy-anhydride polymer with HTC-oligomers has a transverse thermal conductive value of at least 0.50 W/mK and a thickness value of at least 0.99 W/mK. The transverse verses thickness directions are determined by the epoxy structure. Epoxies such as LCT-epoxy anhydride with HTC-oligomers form crystalline microstructures that have a layered nature. Transverse refers to following the plane of the layer, while thickness is perpendicular to it. By transferring heat quicker, a power generator can produce more power and run more efficiently. New electrical appliances may be made with improved insulators according to the present invention, or old ones may be easily retrofitted, thereby increasing the efficiency of these devices as well as similar products.

This enhanced thermal conductivity is achieved without compromising on electrical insulation or other structural integrities. The dielectric strength of the LCT-epoxy polymers with HTC-oligomers is 1.2 kilovolts per millimeter (kV/mil) or greater.

As will be apparent to one of ordinary skill in the art, the LCT-epoxy polymers with HTC-oligomers can be applied to materials, whether an electrical insulator or otherwise, prior to being cured. There are many methods of coating materials with epoxy resins and then curing the product. One such method is vacuum pressure impregnation (VPI). This method is used on devices such as stator conductor coils. A mica/glass insulating tape is applied to the coils, then the coils are placed in a vacuum vessel and a vacuum is applied. After a period of time, resin is admitted to the coils to impregnate them. Pressure is applied to force the resin in and minimize voids, which will affect conductivity. After this is completed, the coils are heated to cure the resin. The resin may contain an accelerator or the tape may have one in it. A variation of this, global VPI involves the process where dry insulated coils are wound, and the then whole stator is vacuum pressure impregnated rather than the individual coils.

FIG. 1 is a flow-chart summarizing aspects and particular embodiments of the present invention. The making of homogenous LCT-epoxy polymers with oligomers containing grafted nano-sized HTC-materials begins mixing of at least one LCT-epoxy and at least one HTC-oligomer. A particular embodiment shown here, however, begins with adding of suitable HTC-oligomer sample 2 to an LCT-epoxy 4. As discussed earlier, HTC-oligomer refers to an oligomer with grafted nano-sized HTC materials that is capable of being reacted with the LCT-epoxy resins. Particular types of HTC-material include nano-sized alumina, silica and metal oxides, including magnesium and zinc oxide. The LCT-epoxy 4 is prepared for mixing with the HTC-oligomer sample, which typically involves heating. If it is desired to produce an LCT-epoxy anhydride resin with HTC-oligomers, then at least one anhydride reagent 6 is added to the LCT-epoxy. In the examples given above, the adding of the anhydride reagent to the LCT-epoxy occurs before the addition of the HTC-oligomer sample, but this need not necessarily be the case. Similarly, a vinyl group may be added, which usually depends on what type of LCT-epoxy resins and what type of HTC-oligomers are being used and under what conditions. The results are, depending on whether or not the anhydride reagent and/or the vinyl reagent is added, non-cured LCT-epoxy resins with HTC-oligomers or a non-cured LCT-epoxy-anhydride/vinyl resins with HTC-oligomers 8. At this point the resin may be cured 12 by a variety of methods known in the art. However, a common application of the present invention is expected to be the coating of electrical insulation materials, in which case the resin is coated on these materials prior to being cured 10.

Figure 2:
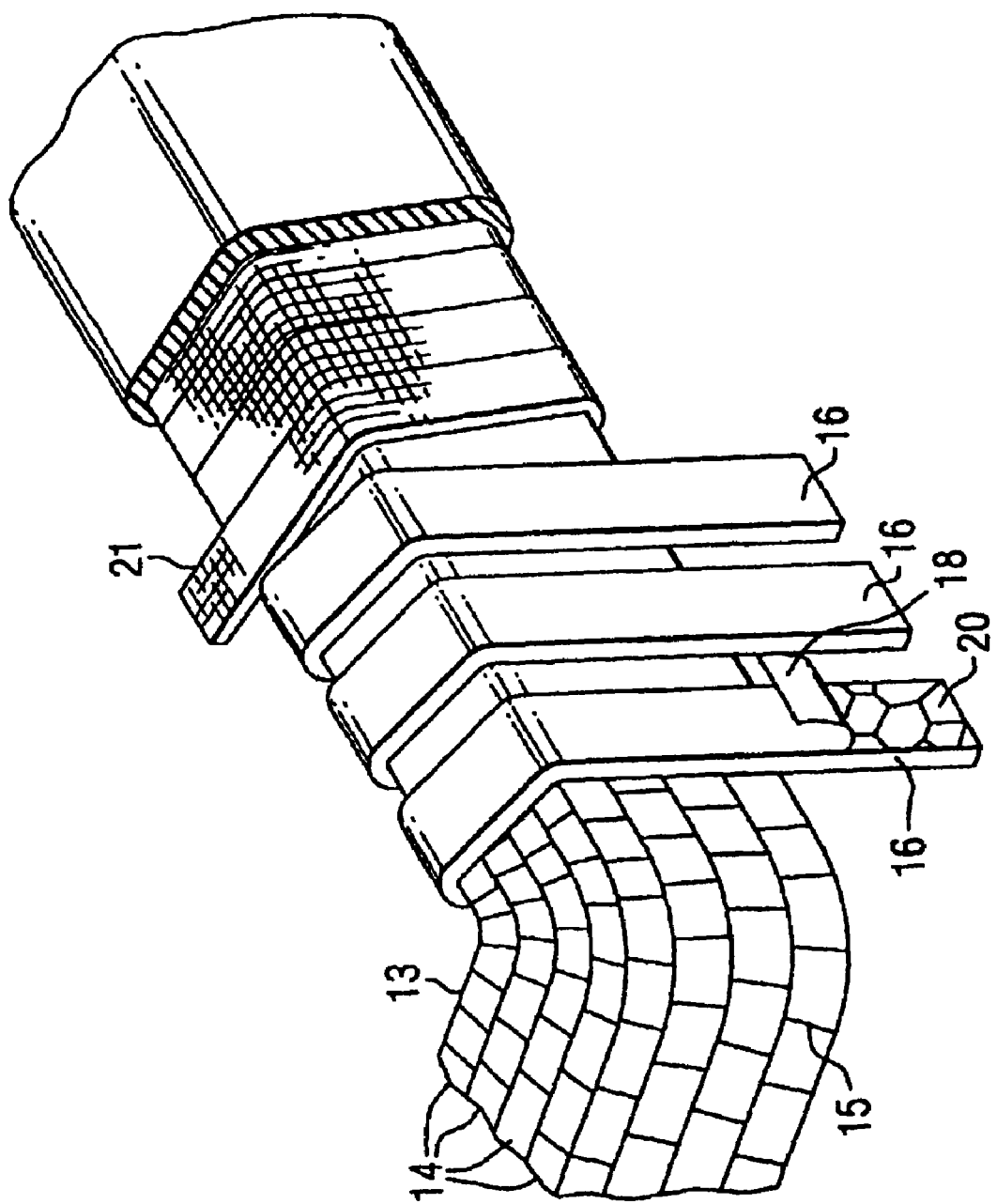
FIG. 2 shows an application for the LCT-epoxy polymers with HTC-oligomers of the present invention for use in groundwall insulation.

A non-limiting example of an electrical insulation material used with the present invention is shown in FIG. 2. Illustrated here is a coil 13, comprising a plurality of turns of conductors 14. Each turn of the conductor 14 consists essentially of a copper bar or wire wrapped with a turn insulation 15. The turn insulation 15 is prepared preferably from a fibrous sheet or strip which may impregnated with the LCT-epoxy resin with HTC-oligomers of the present invention, or alternatively another type of resin known in the prior art. The turn insulation 15 may be not adequate alone to withstand the severe voltage gradients that will be present between the conductor and ground when the coil is installed in a high-voltage generator. Therefore, ground insulation for the coil is provided by wrapping one or more layers of composite mica tape 16 about the turn 14.

Such a mica-tape 16 comprises a pliable backing sheet 18 of, for example, poly-ethylene glycol terephthalate or glass fabric mat, having a layer of mica flakes 20 bonded to the LCT-epoxy resin with HTC-oligomers of the present invention. The tape 16 may be applied half lapped, abutted or in any other suitable manner. Generally, multiple layers of the mica tape 16 are wrapped about the coil with sixteen or more layers generally being used for high voltage coils. The number of layers may be decreased depending on the power of the generator and the effectiveness of the insulator as both in both its abilities to insulate electrically and conduct heat. To impart better abrasion resistance and to secure a tighter insulation, a wrapping of an outer tape 21 of a tough fibrous material, for example, glass fiber, asbestos or the like may be applied to the coil.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. A method of making homogenous LCT-epoxy polymers with HCT-oligomers having a dielectric strength of at least 1.2 kV/mil comprising:
    grafting at least one functionalized organic group onto at least one nano-sized HTC-material to produce HTC-oligomer product;
    reacting said HTC-oligomer product with at least one LCT-epoxy resin under sufficient conditions to form a uniform dispersion and an essentially complete co-reactivity of said HTC-oligomer product with said at least one LCT-epoxy resin, wherein a mixture is formed; and curing said mixture to produce said homogenous LCT-epoxy polymers with HTC-oligomers;

wherein the amount of said HTC-oligomer product to said at least one LCT-epoxy resin comprises a ratio of between 1:4 and 3:1 by weight;

whereby the homogeneous nature of said LCT-epoxy polymers enables the dielectric strength of at least 1.2 kV/mil.

2. The method of claim 1, wherein said at least one nano-sized HTC-material comprises at least one of alumina, silica and a metal oxide.

3. The method of claim 2, wherein said metal oxide is magnesium oxide.

4. The method of claim 1, wherein the grafting said at least one functionalized organic group onto said at least one nano-sized HTC-material is performed by at least one of a silane grafting and a free radical grafting.

5. The method of claim 1, wherein the HTC-oligomer portions of said homogenous LCT-epoxy polymers with HTC-oligomers is 20–50% by weight.

6. The method of claim 1, wherein reacting said HTC-oligomer product with said at least one LCT-epoxy further comprises warming until said mixture is clear.

7. The method of claim 1, further comprising mixing at least one anhydriding agent with at least one of said at least one LCT-epoxy resin and said HTC-oligomer product, wherein said homogenous LCT-epoxy polymers with HTC-oligomers are a homogenous LCT-epoxy anhydride polymers with HTC-oligomers.

8. The method of claim 7, wherein said anhydriding agent is taken from the group consisting of 1-methylhexahydrophthalic anhydride and 1-methyltetrahydrophthalic anhydride.

9. The method of claim 7, wherein said anhydriding agent is approximately 20–40% by weight of said homogenous LCT-epoxy polymers with HTC-oligomers.

10. The method of claim 1, further comprising mixing at least one vinyl agent with at least one of said at least one LCT-epoxy resin and said HTC-oligomer product, wherein said homogenous LCT-epoxy polymers with HTC-oligomers are a homogenous LCT-epoxy vinyl polymers with HTC-oligomers.

11. The method of claim 10, wherein said vinyl agent is p-vinylphenylglycidylether.

12. The method of claim 10, wherein said vinyl portion is approximately 4–16% by weight of said homogenous LCT-epoxy polymers with HTC-oligomers.

13. The method of claim 1, wherein said mixture is added to an electrical insulator as a coating before curing.

14. A method of making homogenous LCT-epoxy polymers with HTC-oligomers having a dielectric strength of at least 1.2 kV/mil coated on at least one electrical insulator comprising the steps of:

grafting at least one functionalized organic group onto at least one nano-sized HTC-material to produce HTC-oligomer product;

reacting said HTC-oligomer product with at least one LCT-epoxy resin wherein a mixture is formed;

warming said mixture under sufficient conditions to form a uniform dispersion and an essentially complete co-reactivity of said HTC-oligomer product with said at least one LCT-epoxy resin;

impregnating said mixture onto said electrical insulator; and curing said mixture to produce said homogenous LCT-epoxy polymers with HTC-oligomers;

wherein the amount of said HTC-oligomer product to said at least one LCT-epoxy resin comprises a ratio of between 1:4 and 3:1 by weight;

whereby the homogeneous nature of said LCT-epoxy polymers enables the dielectric strength of at least 1.2 kV/mil.

15. The method of claim 14, further comprising mixing at least one anhydriding agent with at least one of said at least one LCT-epoxy resin and said HTC-oligomer product, wherein said homogenous LCT-epoxy polymers with HTC-oligomers are a homogenous LCT-epoxy anhydride polymers with HTC-oligomers.

16. The method of claim 14, further comprising mixing at least one vinyl agent with at least one of said at least one LCT-epoxy resin and said HTC-oligomer product, wherein said homogenous LCT-epoxy polymers with HTC-oligomers are a homogenous LCT-epoxy vinyl polymers with HTC-oligomers.

17. The method of claim 14, wherein said electrical insulator is a mica/glass insulating tape.

18. Homogenous LCT-epoxy polymers with HTC-oligomers comprising:

at least one HTC-oligomer sub-structure containing at least one nano-sized HTC-material grafted thereto;

at least one LCT-epoxy sub-structure;

a thermal conductivity in the transverse direction of at least 0.50 W/mK and in the thickness direction of at least 0.99 W/mK in an environment of 25° C.; and a dielectric strength of at least 1.2 kV/mil;

wherein said HTC-oligomer sub-structure is organically bonded to said LCT-epoxy substructure;

wherein approximately 20–75% by weight of said homogenous LCT-epoxy polymers with HTC-oligomers is said HTC-oligomer sub-structure; and wherein said homogenous LCT-epoxy polymers with HTC-oligomers are substantially free of particle wetting and micro-void formation;

whereby the homogeneous nature of said LCT-epoxy polymers enables the dielectric strength of at least 1.2 kV/mil.

19. The homogeneous LCT-epoxy polymers with HTC-oligomers of claim 18, wherein said at least one nano-sized HTC-material comprises at least one of an alumina, a silica and a metal oxide.

20. The homogeneous LCT-epoxy polymers with HTC-oligomers of claim 18, wherein said homogenous LCT-epoxy polymers with HTC-oligomers contain at least one anhydride, and wherein said anhydride portion is approximately 20–40% by weight of said homogenous LCT-epoxy polymers with HTC-oligomers.

21. The homogeneous LCT-epoxy polymers with HTC-oligomers of claim 18, wherein said homogenous LCT-epoxy polymers with HTC-oligomers contain at least one vinyl, and wherein said vinyl portion is approximately 4–16% by weight of said homogenous LCT-epoxy polymers with HTC-oligomers.

22. The homogeneous LCT-epoxy polymers with HTC-oligomers of claim 18, wherein said homogenous LCT-epoxy polymers with HTC-oligomers are integrally formed with at least one electrical insulator.

* * * * *